United States Patent
Lin et al.

(10) Patent No.: US 8,732,367 B2
(45) Date of Patent: May 20, 2014

(54) BUS HOST CONTROLLER AND METHOD THEREOF

(75) Inventors: Ching-Chih Lin, Taipei County (TW); Pao-Shun Tseng, Taipei County (TW); Wen-Hung Peng, Taipei County (TW)

(73) Assignee: Asmedia Technology Inc., New Taipei (TW)

( * ) Notice: Subject to any disclaimer, the term of this patent is extended or adjusted under 35 U.S.C. 154(b) by 72 days.

(21) Appl. No.: 13/352,532

(22) Filed: Jan. 18, 2012

(65) Prior Publication Data

US 2012/0185627 A1 Jul. 19, 2012

(30) Foreign Application Priority Data

Jan. 18, 2011 (TW) .............................. 100101832 A

(51) Int. Cl.
*G06F 13/36* (2006.01)
*G06F 13/362* (2006.01)
*G06F 12/00* (2006.01)
*G06F 13/14* (2006.01)
*G06F 13/38* (2006.01)

(52) U.S. Cl.
USPC ............ 710/113; 710/116; 710/241; 710/244

(58) Field of Classification Search
USPC .................... 710/113, 116, 240–244
See application file for complete search history.

(56) References Cited

U.S. PATENT DOCUMENTS

| | | | |
|---|---|---|---|
| 6,092,142 A * | 7/2000 | Mehta et al. ................. | 710/316 |
| 6,199,132 B1 * | 3/2001 | Hewitt et al. ................ | 710/107 |
| 6,542,947 B1 * | 4/2003 | Buhring ....................... | 710/107 |
| 6,801,959 B1 * | 10/2004 | Crutchfield et al. ........... | 710/30 |
| 7,725,610 B2 * | 5/2010 | Hosokawa ....................... | 710/6 |
| 2001/0018730 A1 * | 8/2001 | Toshitani et al. ............. | 711/167 |
| 2003/0236932 A1 | 12/2003 | Saito et al. | |
| 2005/0080935 A1 * | 4/2005 | Fukae et al. ..................... | 710/1 |
| 2005/0169356 A1 * | 8/2005 | Matsumoto et al. .......... | 375/220 |
| 2006/0156348 A1 * | 7/2006 | Tanabe .......................... | 725/74 |
| 2007/0081453 A1 * | 4/2007 | Hsu et al. ..................... | 370/229 |
| 2010/0077061 A1 * | 3/2010 | Hsueh et al. .................. | 709/219 |

FOREIGN PATENT DOCUMENTS

| | | | | |
|---|---|---|---|---|
| AU | 2008251024 B2 * | 1/2013 | ............... | G06F 1/10 |
| CN | 101968779 A * | 2/2011 | ............... | G06F 13/42 |
| CN | 102063402 A * | 5/2011 | ............... | G06F 13/42 |
| CN | 101711051 B * | 5/2012 | ........... | H04W 52/02 |
| CN | 202904429 U * | 4/2013 | ............... | G06F 1/04 |
| JP | 2004328262 A * | 11/2004 | ............. | H04L 12/40 |
| KR | 100304949 B1 * | 7/2001 | ............. | H04L 12/40 |
| WO | 2008085240 | 7/2008 | | |

OTHER PUBLICATIONS

Thanasorravit, A.; Charoenpanitkit, A.; Wuttisittikulkij, Lunchakorn, "Performance of dynamic frame reservation multiple access-dynamic permission (DFRMA-DP) protocol for integrated voice and data service in wireless communication systems," Vehicular Technology Conference, 2001. VTC 2001 Spring. IEEE VTS 53rd, vol. 3, pp. 2113,2117 vol. 3, 2001.*

(Continued)

*Primary Examiner* — Faisal M Zaman
(74) *Attorney, Agent, or Firm* — WPAT, PC; Justin King

(57) ABSTRACT

A bus host controller and a method thereof are provided. If a terminal device coupled to the bus is a non-periodic device, the bus host controller places a higher priority on data packet transferring request than start-of-frame (SOF) packet transferring request.

8 Claims, 3 Drawing Sheets

(56) References Cited

OTHER PUBLICATIONS

DongSan Jun; HyunWook Park, "An Efficient Priority-Based Reference Frame Selection Method for Fast Motion Estimation in H.264/AVC," Circuits and Systems for Video Technology, IEEE Transactions on , vol. 20, No. 8, pp. 1156,1161, Aug. 2010.*

Saitoh, K.; Inoue, Y.; Iiuka, A.; Morikura, M., "An effective data transfer method by integrating priority control into multirate mechanisms for IEEE 802.11 wireless LANs," Vehicular Technology Conference, 2002. VTC Spring 2002. IEEE 55th, vol. 1, pp. 55,59 vol. 1, 2002.*

Kaye, A.R.; Zhang, S., "Congestion control in integrated voice-data frame relay networks and the case for embedded coding," Global Telecommunications Conference, 1994. GLOBECOM '94. Communications: The Global Bridge., IEEE , vol. 3, pp. 1565,1570 vol. 3, Nov. 28-Dec. 2, 1994.*

* cited by examiner

US 8,732,367 B2

BUS HOST CONTROLLER AND METHOD THEREOF

This application claims the benefit of Taiwan application Serial No. 100101832, filed Jan. 18, 2011, the subject matter of which is incorporated herein by reference.

BACKGROUND OF THE INVENTION

1. Field of the Invention

The invention relates to a bus host controller and, more particularly, to a bus host controller for electronic devices.

2. Description of the Related Art

Electronic systems, such as computer systems, are very important in modern information society. Various electronic devices are integrated into the electronic system, and different electronic devices are coupled together via buses to transfer data and cooperate with each other. For example, a host and peripheral devices in the computer system are different devices and they may be coupled to each other via buses of universal serial bus (USB) specification.

In order to manage data transferring at the bus, a bus host controller is disposed at the host electronic device, and other electronic devices can be regarded as terminal devices of the bus. The bus host controller manages the data transferring sequence in unit of a frame interval. Data transferred from the host electronic device to other electronic devices are carried in data packets and the data packets are sent out in the frame interval of the sequence.

The terminal devices can be divided into periodic terminal devices and non-periodic terminal devices according to functions and operation features. The periodic terminal devices keep a periodic synchronized transferring with the bus host controller. For example, the periodic terminal devices may be multi-media relating devices (such as music or video players or recorders), and they need to receive media data from the host electronic device periodically to keep smooth play of the multi-media. Moreover, a bus hub is also a periodic terminal device. Some terminal devices focus on precision of data transferring, and they are the non-periodic terminal devices. Various non-volatile peripher storage aldevices, such as an external hardware drive, an optical disk drive, a flash memory or a card reader, are the non-periodic terminal devices.

Conventionally, the bus host controller transfers start-of-frame (SOF) packets periodically according to a constant frame period (such as 125 µs, 1 µs equals to one millionth of one second), and each of the SOF packets indicates a boundary of a frame interval. The SOF packet can be regarded as a synchronization reference point for the periodic terminal device. Furthermore, the bus host controller uses the SOF packet to detect whether the terminal device is removed and not coupled to the bus. When the bus host controller transfers the SOF packet to the terminal device, if a strong reflection is received, it means the terminal device is removed. The SOF packet also can prevent the terminal device from entering a suspend state.

In contrast to the data packet which carries data, the SOF packet is only used for link management of the bus, and it does not carry data. Thus, the SOF packet transferring affects the data packet transferring, and they are exclusive to each other. In conventional technology, no matter the terminal device is a periodic device or not, when the SOF packet transferring has collision with the data packet transferring, the bus host controller transfers the SOF packet in priority. That means, when an SOF packet is to be sent at a time point "t", any data packet transferring which spans the time point "t" is delayed (or canceled), so as to transfer the SOF packet in priority. As a result, efficiency of the data packet transferring is affected and bandwidth utilization rate of the bus is decreased.

BRIEF SUMMARY OF THE INVENTION

A bus host controller is coupled to a first terminal device via a bus, and the bus host controller includes a timing module and an arbitration module. The timing module generates an SOF packet transferring request according to a frame period. The arbitration module is coupled to the timing module and receives a data packet transferring request. If the first terminal device is a non-periodic device, the arbitration module places a higher priority on the data packet transferring request than the SOF packet transferring request.

A method applied to the bus host controller is provided. The bus host controller is coupled to a plurality of terminal devices via a bus, and the method includes generating an SOF packet transferring request according to a frame period, and placing a higher priority on a data packet transferring request than the SOF packet transferring request if the plurality of terminal devices are non-periodic devices.

If the terminal devices coupled to the bus do not include any periodic devices, the arbitration module places a higher prior on the data packet transferring request than the SOF packet transferring request. On the contrary, if the terminal devices include a periodic device, the arbitration module places a higher prior on the SOF packet transferring request than the data packet transferring request. Thus, speed of data transferring can be increased.

These and other features, aspects and advantages of the present invention will become better understood with regard to the following description, appended claims, and accompanying drawings.

DETAILED DESCRIPTION OF THE EMBODIMENTS

Figure 1:
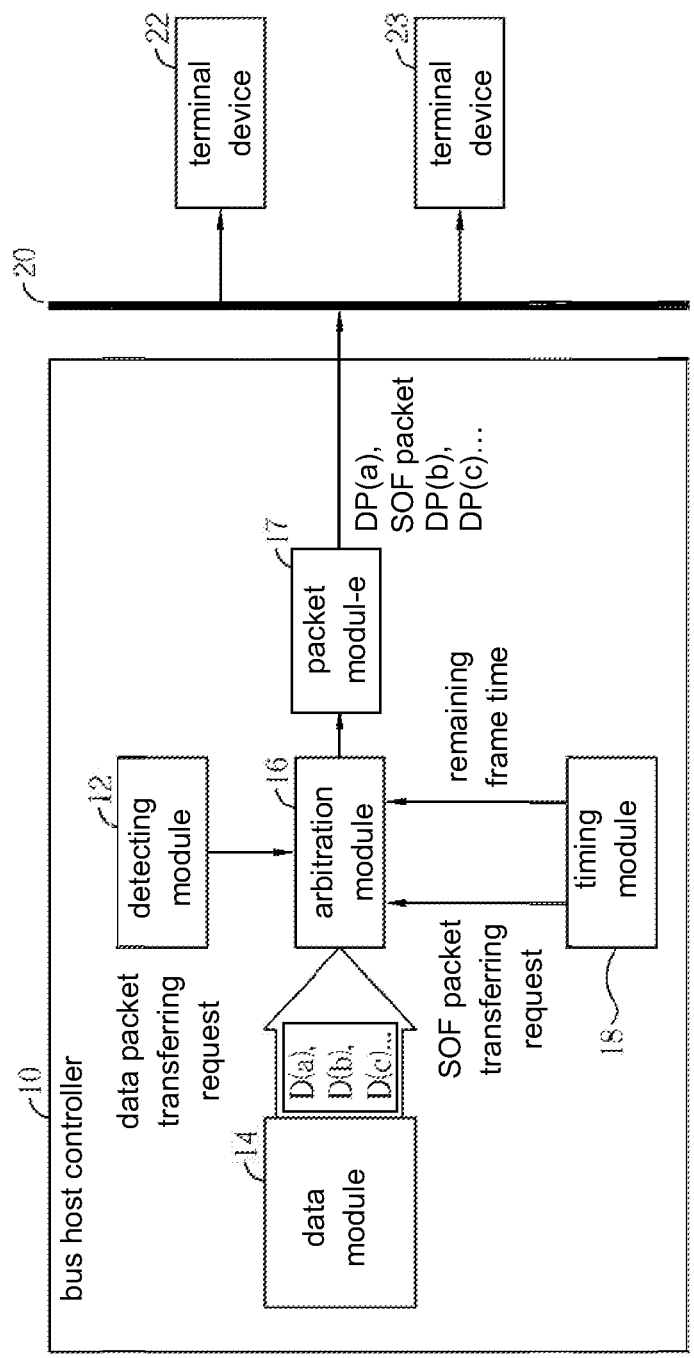
FIG. 1 is a schematic diagram showing a bus host controller in an embodiment.

FIG. 1 is a schematic diagram showing a bus host controller 10 in an embodiment. The bus host controller 10 is coupled to one or more terminal devices (such as terminal devices 22 and 23 in FIG. 1) or hubs via a bus 20. The bus host controller 10 manages data transferring at the bus 20, and it includes a detecting module 12, a data module 14, an arbitration module 16, a packet module 17 and a timing module 18. The detecting module 12, the data module 14 and the timing module 18 are coupled to the arbitration module 16, respectively. The bus host controller 10 is a USB host controller, and the bus 20 may meet the specification of USB 2.0 or latest version. The modules stated above manage data transferring in high speed or full speed in the USB.

In the bus host controller 10, the detecting module 12 is used to detect whether a periodic device is coupled to the bus 20 and transfers the detecting result to the arbitration module 16. For example, if terminal devices 22 or 23 belong to a periodic device, the detecting module 12 checks that the terminal devices 22 and 23 need to keep a periodic synchronized transferring with the bus host controller 10.

When the bus host controller 10 transfers data to the terminal device 22, the data to be transferred, such as temporary data D(a), D(b) and D(c) in FIG. 1, are retrieved from the system and temporarily stored in a data register. The data module 14 generates a data transferring request to the arbitration module 16 to transfer data D(a) to D(c). The packet module 17 encodes data such as D(a), D(b) and D(c) and joins a packet format (such as a header) to form corresponding data packets DP(a) to DP(c). The packet module 17 is also used to generate an SOF packet.

The timing module 18 generates an SOF (SOF packet in FIG. 1) transferring request periodically according to a constant frame period (such as 125 μs). After data such as D(a) are transferred in a frame period, if other data such as data D(b) and D(c) waits to be transferred, the timing module 18 can calculate whether the remaining time in the frame period is enough for transferring of data D(b) or D(c) in full packet format and codes. The arbitration module 16 determines whether to transfer the data packet DP(b) or DP(c) corresponding to data D(b) or D(c) according to the calculating result of the timing module 18. When the arbitration module 16 determines to transfer data (such as D(b)), the data are transferred to the packet module 17, the packet module 17 encodes data, joins a packet format to form a complete packet such as DP(b) and transfers the packet to the bus 20.

Conventionally, if the timing module 18 calculates and gets that the remaining time in the frame period is not enough for transferring the data packet DP(b), the arbitration module delays the data packet DP(b) transferring to transfer the SOF packet in priority before the frame period ends and indicate start of the next frame period.

However, in the embodiment, the arbitration module 16 determines whether to transfer the SOF packet in priority according to the detecting result of the detecting module 12. If the terminal devices 22 and 23 coupled to the bus do not include any periodic devices, the arbitration module 16 ignores the calculating result of the timing module 18 and transfers the data packet DP(b) in priority. After the data packet DP(b) is transferred, the SOF packet is transferred. That means, if the terminal devices (such as the terminal devices 22 and 23 in FIG. 1) coupled to the bus 20 do not include any periodic devices, when the data packet transferring request has collision with the SOF packet transferring request, the arbitration module 16 places a higher priority on the data transferring request than the SOF transferring request, responds to the data transferring request in priority, and transfers the data packet first.

If the terminal devices (such as the terminal devices 22 and 23 in FIG. 1) include any periodic devices, when the timing module 18 calculates and gets that the remaining time in the frame period is not enough to transfer a data packet, the arbitration module 16 delays the data packet transferring according to the calculation of the timing module 18, so as to transfer the SOF packet in priority before the frame period ends. That means, if the terminal devices include one or more periodic devices, the arbitration module 16 changes a higher priority on the SOF transferring request than the data transferring request to keep synchronization with the periodic devices.

Figure 2:
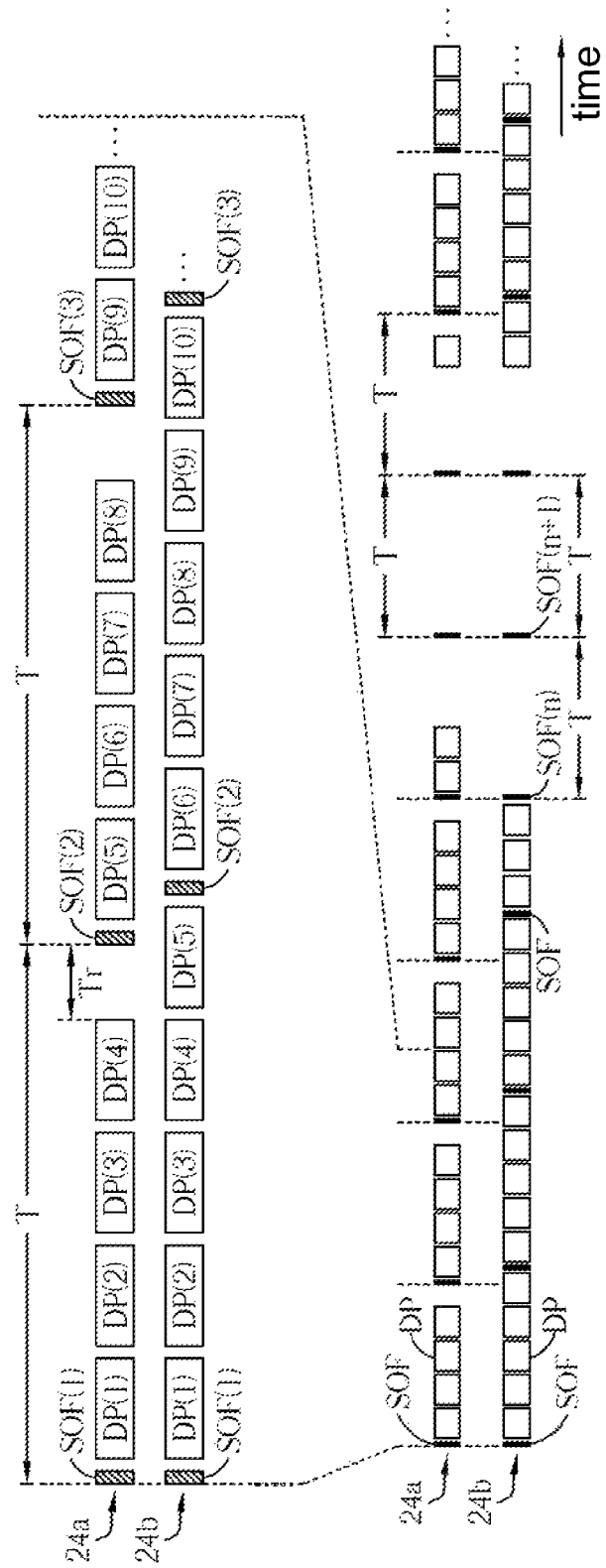
FIG. 2 is a schematic diagram showing operation sequence of the bus host controller in FIG. 1.

FIG. 2 is a schematic diagram showing operation sequence of the bus host controller 10 in FIG. 1. If the terminal devices (such as the terminal devices 22 and 23 in FIG. 1) include one or more periodic devices, the bus host controller 10 operates according to sequence 24a. In the sequence 24a, the bus host controller 10 transfers the SOF packets, such as SOF(1), SOF(2) and SOF(3), periodically according to the frame period T. Each of the SOF packet indicates boundary of a frame interval, and the data packets DP, such as DP(1) to DP(10), are transferred in the frame interval. When transferring of a data packet DP occupies time point of a periodic transferring of the SOF packet, the transferring of the data packet DP is delayed. For example, after the data packet DP(4) is transferred, although a remaining time interval Tr exists in the frame period T, if the next data packet DP(5) is transferred, the SOF packet SOF(2) cannot be transferred at the boundary of the frame period T. In order to transfer the SOF packet SOF(2) on time, the transferring of the data packet DP(5) is delayed to be transferred in the next frame period T. Consequently, no data are transferred in the time interval Tr.

In contrast to the sequence 24a, if the terminal device 22 is a non-periodic device, the bus host controller 10 operates according to the sequence 24b. For example, after the SOF packet SOF(1) starts a frame interval, the data packets DP(1) to DP(4) are transferred in sequence. After the data packet DP(4) is transferred, the data packet DP(5) of the data module 14 waits to be transferred, but the SOF packet SOF(2) of the timing module 18 also waits to be transferred, so the two transferring requests collide to each other. However, since the terminal device 22 is a non-periodic device, the arbitration module 16 transfers the data packet DP(5) in priority, and then transfers the SOF packet SOF(2). Thus, the time interval Tr is not wasted in waiting for the transferring of the SOF packet SOF(2), and the bandwidth utilization rate of the bus is improved. The time interval between the SOF packets SOF(1) and SOF(2) may not equal to the frame period T.

In the sequence 24b, if after an SOF packet SOF(n) is transferred, no data packet transferring has collision with the next SOF packet SOF(n+1) after the frame period T, the SOF packet SOF(n+1) is transferred after the frame period T. That is, the time interval between the SOF packets SOF(n) and SOF(n+1) may equal to the frame period T.

Comparing the transferring of the data packets DP(1) to DP(10) in the sequence 24a and that in the sequence 24b, the sequence 24b shortens the data transferring time effectively and improves the bandwidth utilization rate of the bus.

Figure 3:
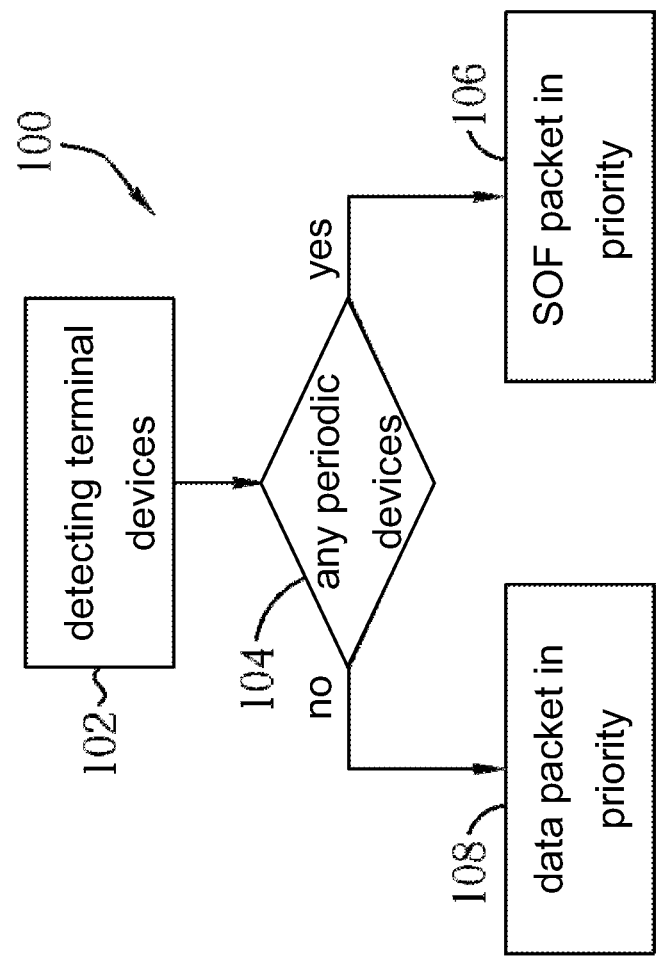
FIG. 3 is a flow chart showing operating process of the bus host controller in FIG. 1.

FIG. 3 is a flow chart 100 showing operating process of the bus host controller 10 in FIG. 1. Main steps in the flow chart 100 are as follows:

Step 102: detecting whether the terminal devices (the terminal devices 22 and 23 in FIG. 1) coupled to the bus 20 include any periodic devices. For example, when the terminal device 22 is coupled to the bus 20 via a connector (not shown), Step 102 is executed.

Step 104: if the terminal devices (the terminal devices 22 and 23 in FIG. 1) include any periodic devices, Step 106 is executed. Otherwise, Step 108 is executed.

Step 106: in order to keep the periodic synchronization between the periodic device and the bus host controller, the SOF packet transferring is prior to the data packet transferring.

Step 108: since the terminal devices (the terminal devices 22 and 23 in FIG. 1) are non-periodic devices, the data packet transferring is prior to the SOF packet transferring to improve the bandwidth utilization rate.

In sum, adaptive operations are executed according to whether the terminal devices coupled to the bus include any periodic devices. For the periodic device, the periodic synchronization is kept, and for the non-periodic device, the bandwidth utilization rate and efficiency of data transferring are improved. The time interval between the two SOF packets may not equal to the frame period, but the SOF packet transferring goes on. Thus, the bus host controller can detect whether the terminal device is removed via the SOF packet and prevent the terminal device from entering a suspend state.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A bus host controller coupled to a first terminal device via a bus, the bus host controller comprising:
   a timing module generating a start-of-frame (SOF) packet transferring request according to a frame period, and capable of calculating whether a remaining time in the frame period is enough for transferring a data packet; and
   an arbitration module coupled to the timing module and receiving a data packet transferring request, wherein if the first terminal device is a non-periodic device, the arbitration module places a higher priority on the data packet transferring request than the SOF packet transferring request, such that when the SOF packet transferring request and the data packet transferring request collide, an SOF packet corresponding to the colliding SOF packet transferring request is reserved and delayed to be transferred after a data packet corresponding to the colliding data packet transferring request.

2. The bus host controller according to claim 1, wherein the bus host controller further includes a second terminal device coupled to the bus, and if the second terminal device is a periodic device, the arbitration module changes the priority of the SOF packet transferring request to a priority which is higher than that of the data packet transferring request.

3. The bus host controller according to claim 1, wherein the bus host controller further includes:
   a data module coupled to the arbitration module and generating the data packet transferring request to the arbitration module.

4. The bus host controller according to claim 1, wherein the bus host controller further includes:
   a detecting module coupled to the arbitration module and detecting whether the terminal device is a periodic device.

5. The bus host controller according to claim 1, wherein the bus is a universal serial bus (USB).

6. A method applied to a bus host controller which is coupled to a plurality of terminal devices via a bus, and the method comprising:
   generating an SOF packet transferring request according to a frame period;
   calculating whether a remaining time in the frame period is enough for transferring a data packet; and
   placing a higher priority on a data packet transferring request than the SOF packet transferring request if the plurality of terminal devices are non-periodic devices, such that when the SOF packet transferring request and the data packet transferring request collide, an SOF packet corresponding to the colliding SOF packet transferring request is reserved and delayed to be transferred after a data packet corresponding to the colliding data packet transferring request.

7. The method according to claim 6, wherein the method further includes:
   changing the priority of the SOF packet transferring request to a priority which is higher than that of the data packet transferring request if one of the plurality of terminal devices is a periodic device.

8. The method according to claim 6, wherein after the SOF packet transferring request is generated according to the frame period, the method further includes:
   detecting whether the terminal devices include the periodic device.

* * * * *